United States Patent [19]

Augier

[11] Patent Number: 4,575,125

[45] Date of Patent: Mar. 11, 1986

[54] ARTICLES HAVING INVERTIBLE LETTERING THEREON

[75] Inventor: Pierre J. Augier, Grosse Pointe Park, Mich.

[73] Assignee: Uniroyal, Inc., Middlebury, Conn.

[21] Appl. No.: 562,684

[22] Filed: Dec. 19, 1983

[51] Int. Cl.⁴ .............................................. B42D 15/00
[52] U.S. Cl. .................. 283/1 R; D11/116; 206/459
[58] Field of Search ............ 283/1 R, 1; 40/605, 40/615, 618; 206/459; D18/24, 25; D11/116

[56] References Cited

U.S. PATENT DOCUMENTS

| | | | |
|---|---|---|---|
| D. 242,186 | 11/1976 | Lengyel | D11/116 |
| 3,611,291 | 10/1971 | Frank | 283/1 R |
| 3,709,525 | 1/1973 | Frank | 283/1 R |

Primary Examiner—Paul A. Bell
Assistant Examiner—Paul M. Heyrana, Sr.
Attorney, Agent, or Firm—Donald W. Walk

[57] ABSTRACT

An article (e.g., a tire, a package, a label) having upon a surface thereof one or more identifying words composed of a plurality of letters chosen from an alphabet of distinctive letters. The letters, when uninverted, are readily distinguishable from one another upon comparison of the characteristic features of one letter with those of the remaining letters in the alphabet. In the particular embodiment illustrated, twenty-four of the twenty-six letters in the alphabet are invertible and form, when inverted, either the same letters or other letters of the alphabet. This allows uninverted words or groups of words to be selectively composed from the letters, which words, when inverted, form either the same words as or different words from the uninverted words.

1 Claim, 9 Drawing Figures

Fig. 3.

| Bad peg | jean neal |
| Bad peg | jean neal |

| dad's pep | new Big man |
| dad's pep | new Big man |

| greg N Barb | new man |
| greg N Barb | new man |

| herb gray | newsman |
| herb gray | newsman |

| inoui | pat N ted |
| inoui | pat N ted |

| | teams sweat |
| | teams sweat |

Fig. 5.

ARTICLES HAVING INVERTIBLE LETTERING THEREON

This invention relates to articles having invertible lettering thereon and, more particularly, to articles having words formed thereon which words, when inverted, form either the same words as, or different words from, the uninverted words.

The term "word" as used herein means the written or printed representation of a sound or a combination of sounds used in communicating intelligence in any language.

It is conventional practice to use standard upper or lower case letters of the alphabet to print or otherwise form words such as trade marks, trade names, warning labels and the like, on products (or packages) which are sold to consumers. Such words are intended to be read in a right-side-up, or uninverted, condition and when inverted, or up-side-down, become difficult to read because of the inversion. If the reader attempts to read them in the normal left-to-right manner when inverted, the resulting graphic symbol groups are generally meaningless since they are formed by characters many of which are neither conventional letters nor close approximations thereof.

Examples of articles on which it would be desirable to easily read inverted lettering are tires, wherein the sidewall logo is readable when it is at the top of the tire but is illegible when it is at the bottom or footprint portion of the tire, warning labels on medicinal products, trademark logos on packages, and the like.

Although various of the conventional letters in the alphabet (particularly in the lower case forms thereof) are recognizable as the same letters in an inverted condition (e.g., "o", "s", "x" and "z") and various others are recognizable as other letters of the alphabet when inverted (e.g., "b/q", "d/p", h/y", "m/w", "n/u") the total number of invertible letters is generally insufficient to allow significant selective composing of uninverted words that are readable in an inverted condition as either the same or as different words.

It is, therefore, a primary object of this invention to provide, for selective use on an article, an alphabet of distinctive letters in which at least three-fourths, and preferably about nine-tenths, of the letters in the alphabet are invertible so as to form, when inverted either the same or other letters of the alphabet.

A further object of this invention is to provide, for use on an article, an alphabet of distinctive letters in which uninverted words or groups of words may be more easily than heretofore selectively composed from such letters, which words, when inverted, form either the same words as or different words from the uninverted words.

Other objects and advantages of this invention will become apparent as the following description proceeds.

Briefly stated, and in accordance with one embodiment of this invention, there is provided an aritcle bearing upon the material thereof one or more identifying words composed of a plurality of letters chosen from an alphabet of distinctive letters, which letters, when uninverted, are readily distinguishable from one another upon comparison of the characteristic features of one letter with those of the remaining letters of the alphabet. At least three-fourths, and preferably about nine-tenths, of the letters in the alphabet are invertible and form, when inverted, either the same letters or other letters of the alphabet so that uninverted words or groups of words may be readily selectively composed from such letters, which words, when inverted, form either the same words as or different words from the uninverted words.

While the specification concludes with claims particularly pointing out and distinctly claiming the subject matter regarded as this invention, is believed that the invention will be better understood from the following description, taken in conjunction with the accompanying drawings, in which:

FIG. 3 shows the full alphabet as used in the present invention, wherein twenty-four of the twenty-six letters of the alphabet are invertible to form either the same or different letters thereof, and two of the letters are uninvertible.

FIG. 5 is a chart showing a number of examples of words composed from the special alphabet of this invention, which words read the same both in the uninverted and in the inverted conditions thereof.

This discussion will now continue with a description of the invention in connection with its use on a tire sidewall; however, it will be apparent to those skilled in the art that the principles disucssed herein are equally applicable to the use of the special alphabet of this invention in connection with other products, ad discussed heretofore.

Figure 1A:
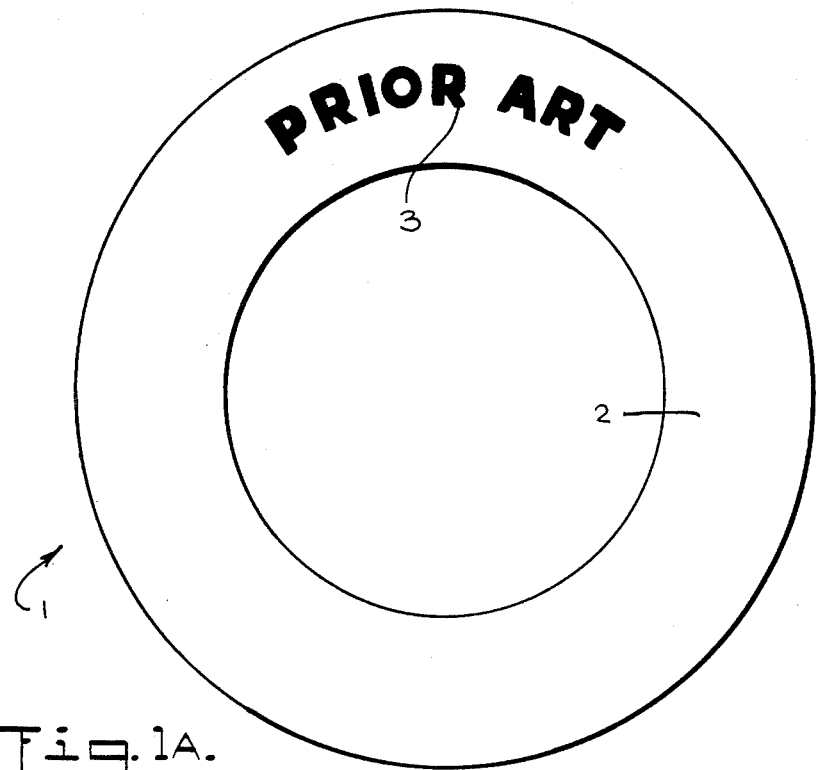
FIGS. 1A and 1B show a vehicle tire having a prior art form of tire markings, with such markings being in the uninverted and inverted positions, respectively, in the figures.
Figure 1B:
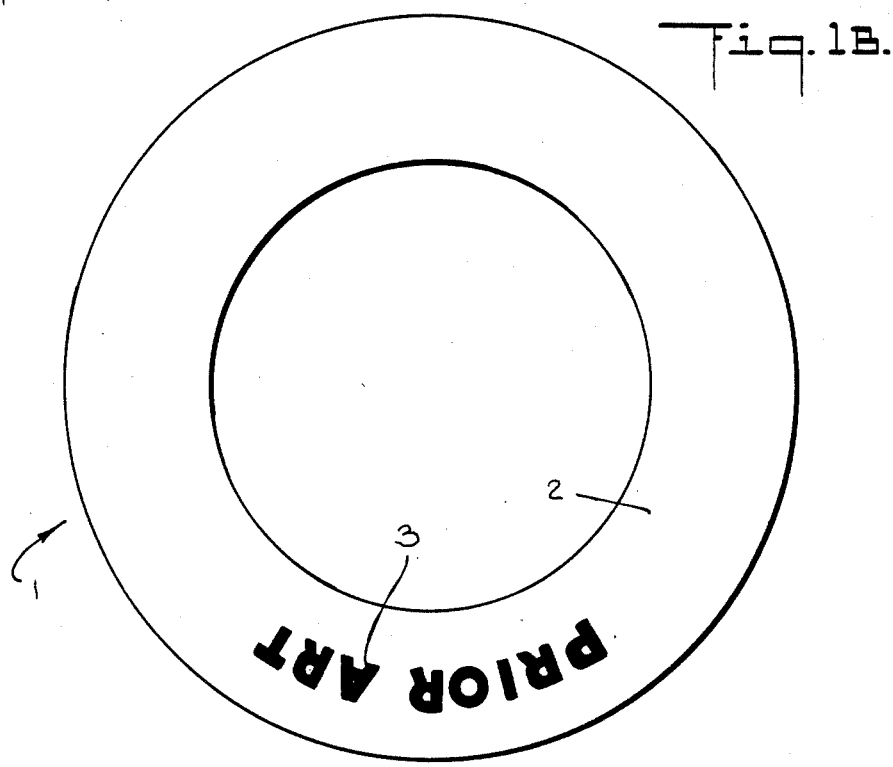

Referring now to FIGS. 1A and 1B of the drawings, a tire, shown generally at 1, has been illustrated. The tire 1 includes a sidewall 2 having a legend 3 comprising the words "PRIOR ART" molded or otherwise formed thereon. The words "PRIOR ART" of legend 3 are formed from conventional upper case letters and the tire 1 and its legend 3 are representative of conventional prior art marking arrangements. In accordance with conventional practice, the lettering of tire sidewalls are generally designed to be read from the center of the wheel. Accordingly, an observer viewing the tire will see the words on the tire sidewall in an uninverted condition when the lettering is at the top of the tire and will see the letters upside-down, or inverted, when the lettering comes down to the footprint, or patch area, of the tire, as shown in FIG. 1B.

Figure 3:
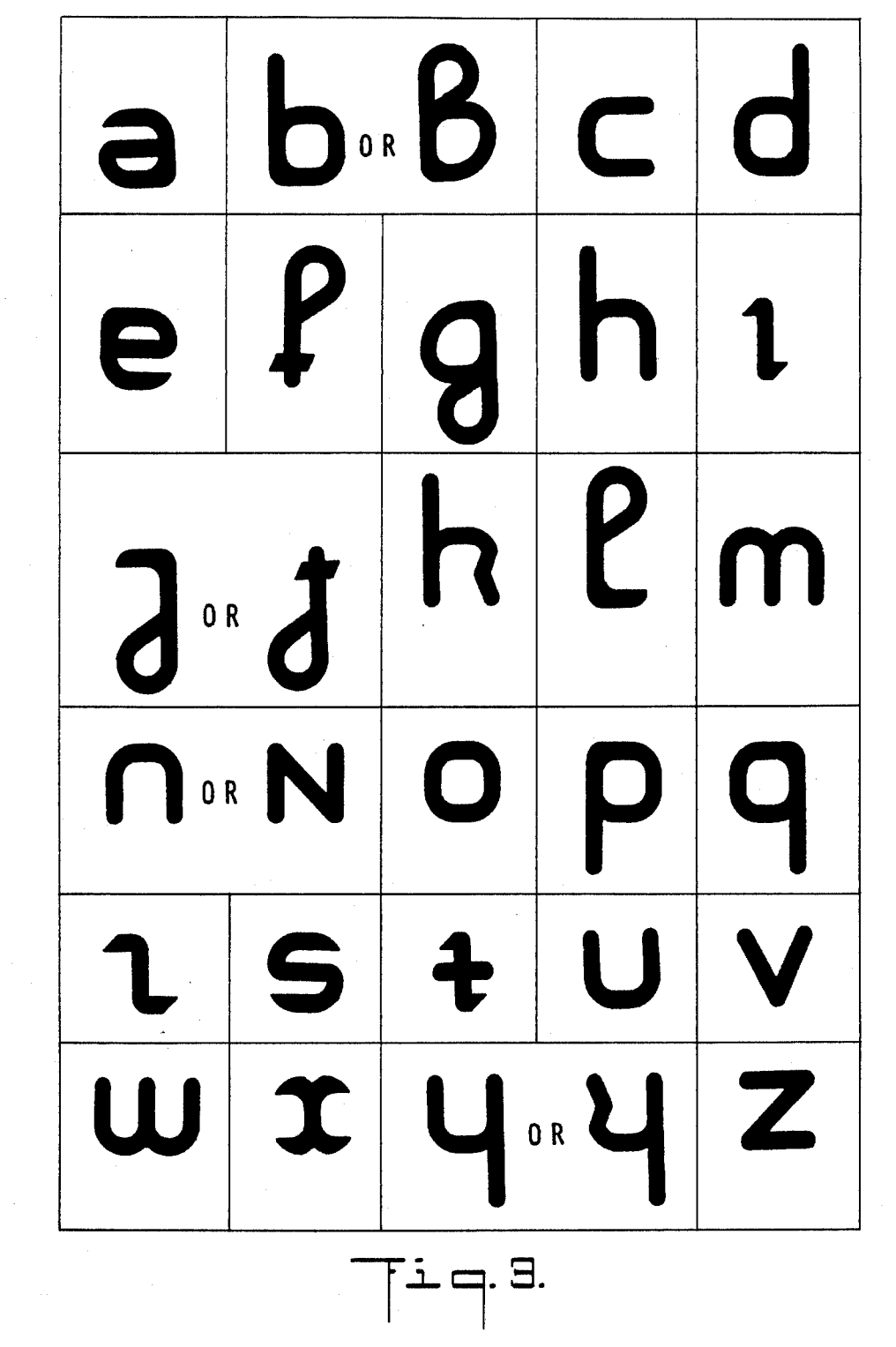

Referring now to FIG. 3, the special alphabet of the present invention has been illustrated therein. This alphabet includes twenty-four invertible letters, "a", "b" (two versions), "d"–"j" (two versions), "k"–"n" (two versions), "o"–"u", "w", "x", "y" (two versions) and "z". It also includes two non-invertible letters, "c" and "v".

Figure 2B:
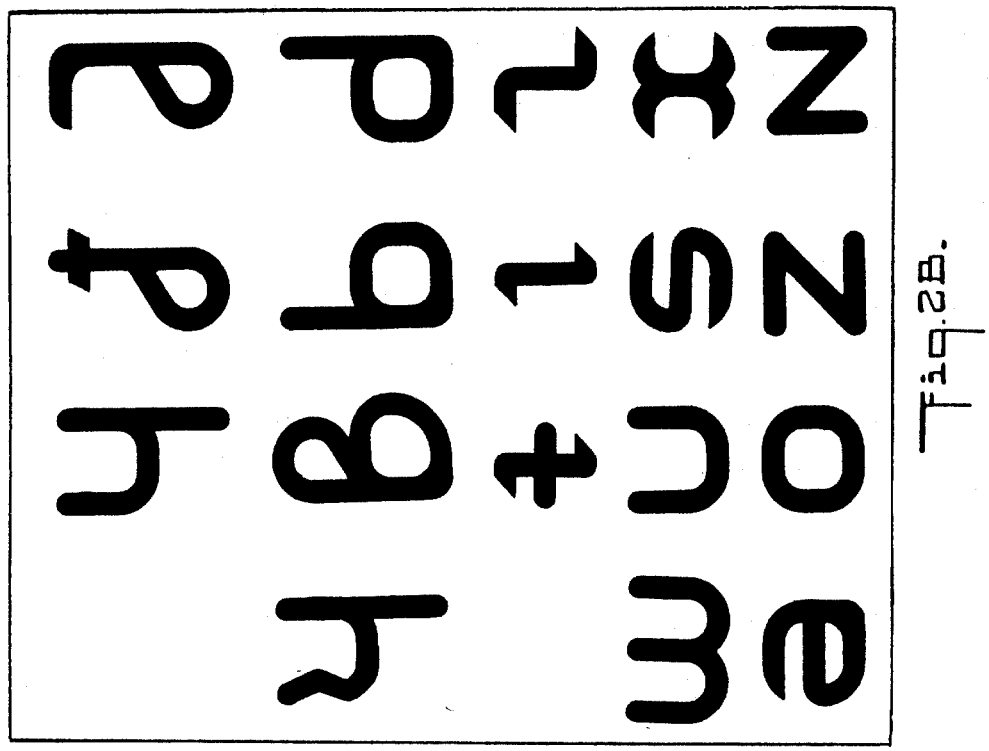
FIGS. 2A and 2B show respective uninverted and inverted conditions of various of the letters used in the special alphabet of the present invention.
Figure 2A:
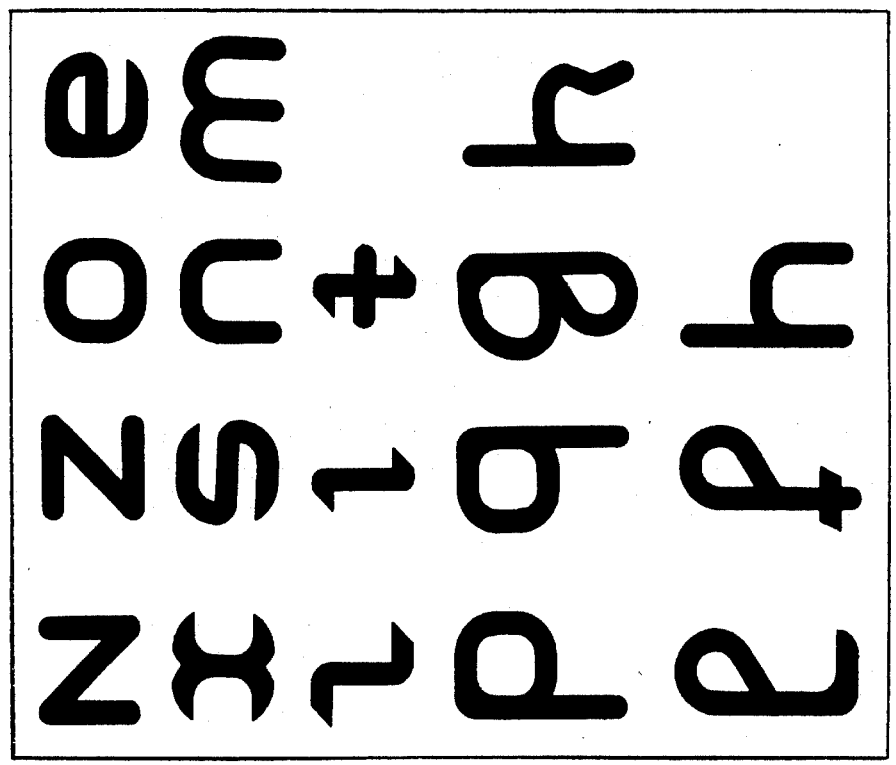

The twenty-four invertible letters of the alphabet shown in FIG. 3 are formed from the eighteen types of invertible graphic symbols shown in FIG. 2A, which symbols are shown in their inverted condition in FIG. 2B.

Considering each of the letters of the special alphabet individually and referring to FIGS. 3 and 2A and 2B, it will be seen that the letter "a", when inverted, forms the letter "e"; the two versions of the letter "b", when inverted, form the corresponding letters "q" and "g"; the letter "d", when inverted, forms the letter "p"; the letter "e", as indicated earlier, forms, the letter "a" when inverted; the letter "f", when inverted, forms one of the two versions of the letter "j"; the letter "g", as indicated earlier, forms one of the two versions of the letter "b" when inverted; the letter "h", when inverted, forms one of the two versions of the letter "y"; the letter "i", when inverted, remains the letter "i"; the two versions of the letter "j", when inverted, form the corresponding letters "l" and "f"; the letter "k", when inverted, forms one of the two versions of the letter "y"; the letter "m", when inverted, forms the letter "w"; the two versions of the letter "n", when inverted, form the corresponding letters "u" and "n"; the letter "o", when inverted, remains the letter "o"; the letter "p", when inverted, forms the letter "d", as indicated earlier; the letter "q", when inverted, forms one of the two versions of the letter "b", as indicated earlier; the letter "r", when inverted, remains the letter "r"; the letter "s", when inverted, remains the letter "s"; the letter "t", when inverted, remains the letter "t"; the letter "u", when inverted, becomes one of the two versions of the letter "n", as indicated earlier; the letter "w", when inverted, becomes the letter "m", as indicated earlier; the letter "x", when inverted, remains the letter "x"; the two versions of the letter "y", when inverted, form the corresponding letters "h" and "k", as indicated earlier; and, the letter "z", when inverted, remains the letter "z".

Figure 4A:
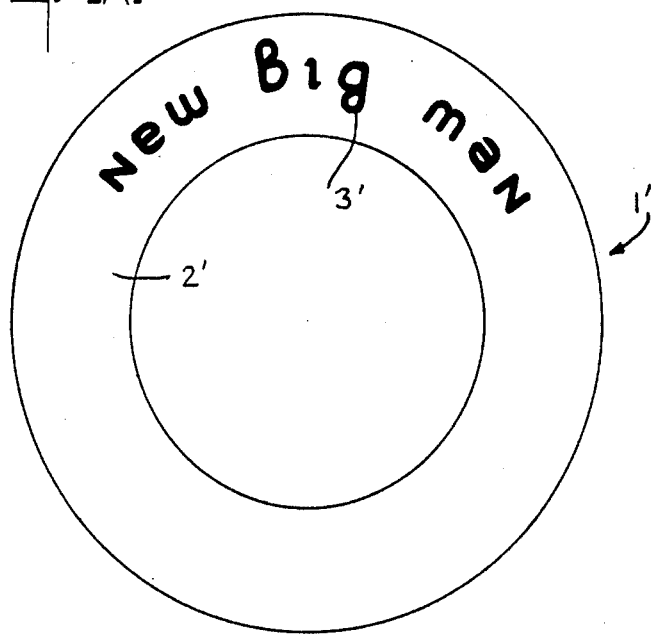
FIGS. 4A and 4B illustrate a vehicle tire having invertible words thereon, which words read the same in both the uninverted and the inverted conditions thereof.
Figure 4B:
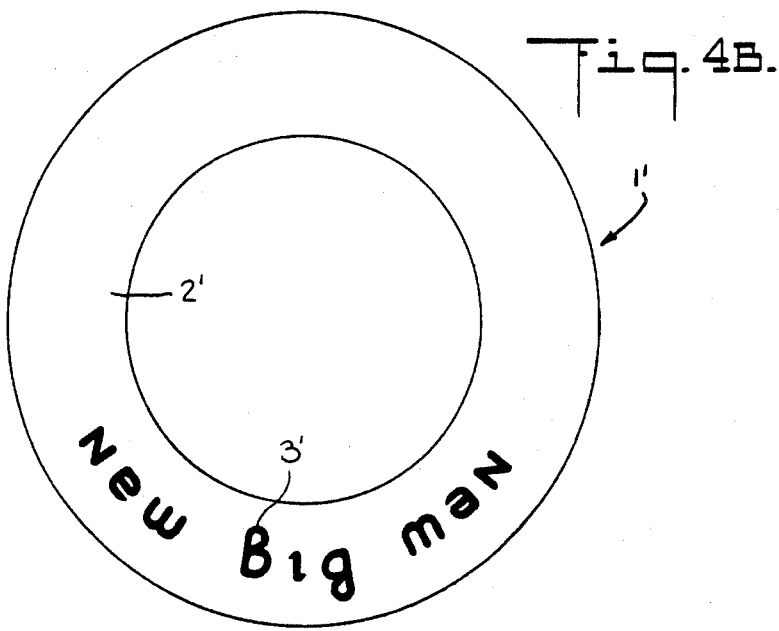

Referring now to FIGS. 4A and 4B, it will be seen that, in accordance with the present invention, words or legends may be selectively composed from the letters of the special alphabet, which words, when inverted, form the same words or legend as the uninverted words. Thus, in the example shown in FIGS. 4A and 4B, the legend 3', "new big man", on the sidewall 2' of the tire 1' is shown in its uninverted condition in FIG. 4A and, when the tire 1' is inverted to the position shown in FIG. 4B, the legend 3' still reads "new big man".

Other examples of words or legends which may be selectively composed to read the same in the uninverted and inverted conditions are illustrated in FIG. 5 of the drawings. Obviously, numerous other uninverted words can be selectively composed from the letters of the special alphabet, which words, when inverted, will form the same words as the uninverted words.

Figure 6:
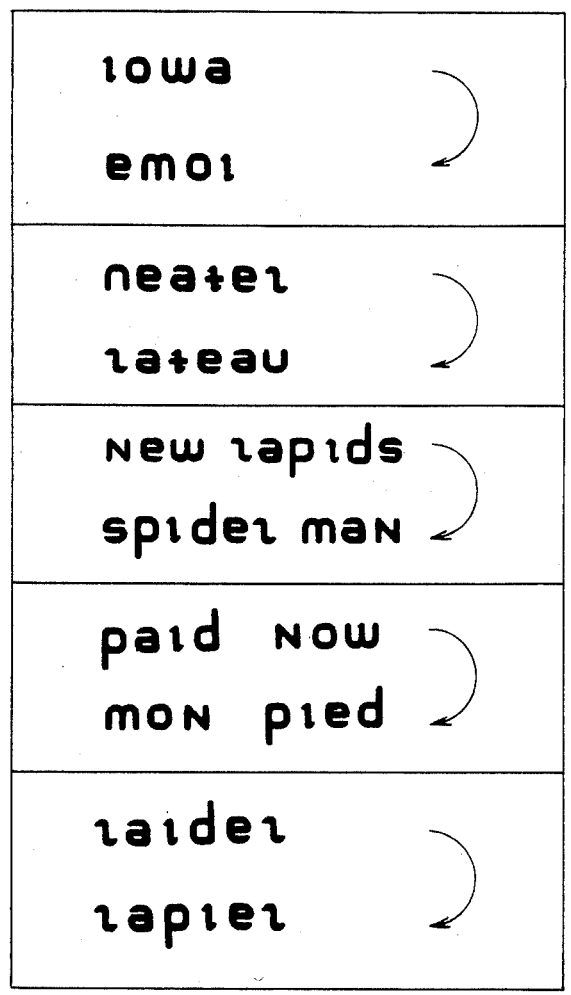
FIG. 6 is another chart showing a number of examples of words composed from the special alphabet of this invention, which words have one meaning when read in the uninverted condition thereof and a different meaning when read in the inverted condition thereof.

Referring now to FIG. 6, a number of examples are given of words or legends that may be composed from the special alphabet, which words or legends read differently in their uninverted condition from their inverted condition. Thus, the words "new rapids", when inverted, read "spider man", and the word "raider", when inverted, reads "rapier".

The principles of the present invention are also applicable to words in languages other than English. For example, as shown in FIG. 5, the French word "inoui", which means "extraordinary" or "unheard of" in French, when inverted also reads "inoui". Similarly, words in one lanuage may, when inverted, form words in another language. For example, as shown in FIG. 6, the words "paid now" become the French words "mon pied", which means "my foot" in French. Obviously, numerous other examples can be devised by creative users of the special alphabet of the present invention.

It should be noted that in order to achieve the benefits of this invention and to facilitate the selective composing of invertible words and legends, at least three-fourths of the letters in the distinctive alphabet of this invention should be invertible, and preferably twenty-four, or about nine-tenths, of the twenty-six letters of such alphabet should be invertible.

While a particular embodiment of this invention has been shown and described, it will be obvious to those skilled in the art that various changes and modifications may be made without departing from this invention in its broader aspects, and it is, therefore, aimed in the appended claims to cover all such changes and modifications as fall within the true spirit and scope of this invention.

What is claimed is:

1. An article bearing upon the material thereof one or more identifying words composed of a plurality of letters chosen from an alphabet comprising twenty-six distinctive letters wherein:
   a. said twenty-six distinctive letters have substantially the configuration shown in FIG. 3 hereof;
   b. twnety-four of said twenty-six distinctive letters are invertible and each of said twenty-four letters form, when inverted, either the same letter as before that letter was inverted or another letter from said alphabet so that uninverted words may be selectively composed of said twenty-four letters, and said words when inverted, can form either the same words or different words from the uninverted words; and
   c. said twenty-six distinctive letters, when univerted, are readily distinguishable from one another upon comparison of the characteristic features of each of the twenty-six distinctive letters.

* * * * *